UNITED STATES PATENT OFFICE.

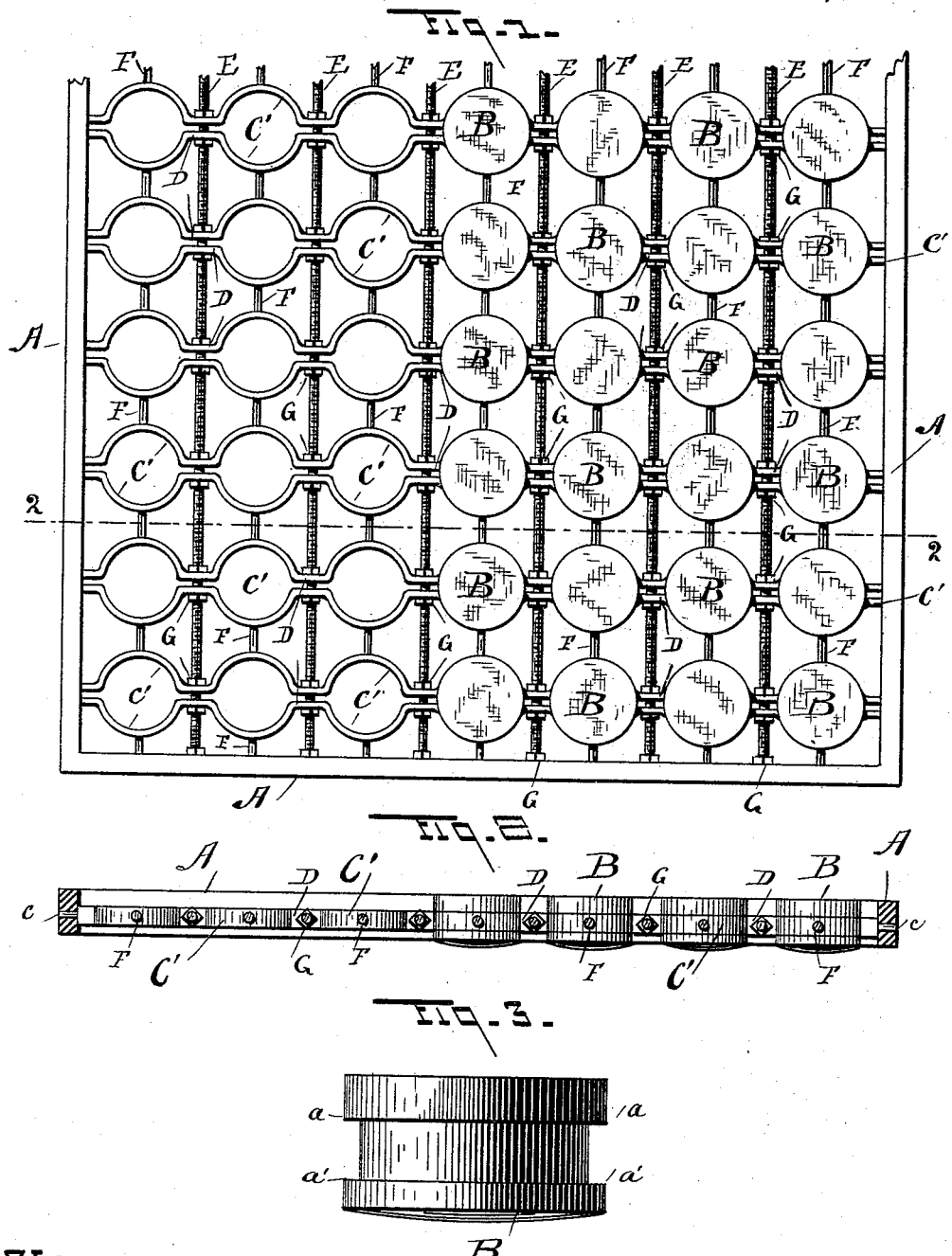

HENRY HAUSTEIN, OF SAN FRANCISCO, CALIFORNIA.

ILLUMINATING-TILE.

SPECIFICATION forming part of Letters Patent No. 492,865, dated March 7, 1893.

Application filed January 7, 1892. Serial No. 417,323. (No model.)

*To all whom it may concern:*

Be it known that I, HENRY HAUSTEIN, a citizen of Austria-Hungary, but having declared my intention to become a citizen of the United States, residing at San Francisco, in the county of San Francisco and State of California, have invented certain new and useful Improvements in Illuminating-Tiles; and I do hereby declare the following to be a full, clear, and exact description of said invention, such as will enable others skilled in the art to which it most nearly appertains to make, use, and practice the same.

My invention relates to improvements in the construction of illuminating tiles, such as may be used for vaults, basements, roofs floors, or for any other purpose in building construction.

Heretofore illuminating tiles have been made of cast iron or other metallic perforated plate to support the glasses or lenses. Thus in filling the spaces between the lenses with plastic material, considerable trouble has to be overcome as the lenses will shift from side to side, while the plastic material is in progress of hardening, which causes leaking around the lenses.

In building roof, or skylights where the illuminating tiles have to be made in angular, or vertical form, or in the shape of an arch, the lenses if set in a perforated metallic plate have to be held by a piece of wood or other material fastened on the outside of the lenses to prevent them from falling out before the filling is completed. By this method of setting the lenses in a perforated plate, part of the surface of the lenses will have to be covered, which greatly intercepts the filling between, and around them; and furthermore the finishing is not accomplished before the removing of the obstruction.

My invention has for its object to provide means whereby glasses or lenses can be held firmly in proper position while overlying the plastic material &c., and consists in placing metallic bars across a section of illuminating tiles, and means to secure the lenses to said bars at any required distance. I attain this object by the construction and arrangement fully illustrated in the accompanying drawings, hereinafter described.

Figure 1 is a top view of a skeleton section of a tile with lenses on one side ready to receive the filling material, and illustrating the method of securing the lenses to metallic bars within the frame of a section. Fig. 2 is a vertical sectional view taken on line 2, 2 of Fig. 1. Fig. 3 is a side view of one of the lenses showing two shoulders formed annularly, one being near the top, and the other near its bottom forming a groove between them to receive the bar fastening.

A represents the frame of an ordinary tile section; B, the glasses, or lenses. Said glasses or lenses are held and connected together within the frame from side to side, or end to end by metallic bars C'. I bend said flat metallic bars C' at certain distances in the shape of half-circle leaving a space between each circle, as at D; holes are punched within this space D, to receive threaded bolts E, which may extend across the section and therefore connect all the bars together in the same manner. These bolts E may be made long enough for each two bars only, and can be riveted, or screwed in if desired. In this case I will place a small dividing rod F, riveted or screwed between the two spaces D so as to connect the bar C', and so on throughout the section. A tenon c may be cut at both ends of said bar C' and can be riveted to an ordinary frame of illuminating tiles as shown in Fig. 2. When this is done the lenses B, can be inserted into the circle provided for them; and by screwing the nuts G placed on bolts E it will cause the two bars to be drawn together. The lenses B, being encircled in this manner the most accurate adjustment can be effected.

I have shown in the drawings, the bars C' as being flat, still they can be made in any other suitable shape or form if desired.

In order to prevent the lenses B, from slipping out of the bars C' while the plastic material is being filled in between said lenses, shoulders *a a'* may be made annularly one above, and one below upon its side leaving an annular groove to receive the metallic bars C' as particularly shown in Fig. 3. Still I propose to use as well any ordinary lenses.

When the section of my illuminating tile is ready to receive the plastic material, the skeleton is placed on a board covered with a sheet of rubber, then the spaces between the lenses are filled in with Portland cement concrete, or any other material in plastic state. Placing the skeleton in this manner the rubber will not absorb the moisture from the Portland cement concrete and will give to the tiles a smoother surface.

Having thus described my invention, what I claim, and desire to secure by Letters Patent of the United States, is—

In illuminating tiles the combination of the lenses with bars arranged in pairs and adapted to receive the said lenses at intervals, an exterior frame to which the said bars are attached and screw-threaded rods E and nuts G for clamping the said bars on the said lenses substantially as set forth.

In testimony whereof I have hereunto affixed my signature in presence of two witnesses.

HENRY HAUSTEIN.

In presence of—
WM. L. MURPHEY,
H. C. BRADLEY.